United States Patent [19]

Yonezu et al.

[11] Patent Number: 5,118,743
[45] Date of Patent: Jun. 2, 1992

[54] METHYLENE-VINYL ALCOHOL COPOLYMER COMPOSITION

[75] Inventors: Kiyoshi Yonezu, Kochi; Akimasa Aoyama, Kurashiki; Takuji Okaya, Nagaokakyo; Satoshi Hirofuji; Yukio Ozeki, both of Kurashiki, all of Japan

[73] Assignee: Kuraray Co., Ltd., Kurashiki, Japan

[21] Appl. No.: 239,112

[22] Filed: Aug. 31, 1988

[30] Foreign Application Priority Data

Sep. 7, 1987 [JP] Japan .................. 62-224296

[51] Int. Cl.5 .............................. C08K 5/09
[52] U.S. Cl. ...................... 524/287; 524/284; 524/300; 524/399; 524/400; 524/405; 524/417; 524/423; 524/424; 524/425; 524/427; 524/436
[58] Field of Search ........... 524/436, 284, 287, 300, 524/399, 400, 405, 417, 423, 424, 425, 427

[56] References Cited

U.S. PATENT DOCUMENTS

| | | | |
|---|---|---|---|
| 3,262,905 | 7/1966 | Martins | 524/417 |
| 3,890,267 | 6/1975 | Fukushima et al. | 524/417 |
| 4,367,305 | 1/1983 | Satoh et al. | 524/398 |
| 4,713,296 | 12/1987 | Aoyama et al. | 428/412 |

FOREIGN PATENT DOCUMENTS

| | | |
|---|---|---|
| 37664 | 11/1971 | Japan . |
| 25048 | 4/1973 | Japan . |
| 51-88544 | 8/1976 | Japan . |
| 51-88545 | 8/1976 | Japan . |
| 52-954 | 1/1977 | Japan . |
| 19242 | 5/1980 | Japan . |

Primary Examiner—Joseph L. Schofer
Assistant Examiner—J. M. Reddick
Attorney, Agent, or Firm—Kramer, Brufsky & Cifelli

[57] ABSTRACT

This invention provides an ethylene-vinyl alcohol copolymer composition having specific flow characteristics in the relationship between the heating time and the extrusion rate measured with a capillary rheometer (Koka Flow Tester), and a multilayered structure utilizing the same.

From the EVOH composition according to the present invention, can be obtained a molded article, particularly a multilayered structure, having an excellent appearance; more particularly, in a continuous melt molding operation over a long period, a molded article, particularly a multilayered structure, having an excellent appearance can always be obtained without worsening the appearance with running time.

8 Claims, 1 Drawing Sheet

METHYLENE-VINYL ALCOHOL COPOLYMER COMPOSITION

BACKGROUND OF THE INVENTION

1. Field of the Invention

This invention relates to an ethylene-vinyl alcohol copolymer (hereinafter referred to as EVOH) composition and a multilayered structure utilizing the same.

2. Description of the Prior Art

EVOH is a useful polymeric material having a high gas barrier property and transparency, as well as oil resistance and odor keeping property, and is Widely used for films, sheets, containers and the like.

EVOH is obtained by saponifying ethylene-vinyl acetate copolymer with caustic alkali. The saponified product can, however, not be subjected to melt-molding as it is, since it readily undergoes thermal decomposition Which causes a large decrease in viscosity and a severe coloring. A variety of means have been employed to improve the above. For example, Examined Published Japanese Patent Application Nos. 37664/1971 and 19242/1980 and Unexamined Japanese patent Laid-Open Nos. 25048/1973, 88544/1976, 88545/1976 disclose the improvements by fully washing EVOH, adding an acid to EVOH, and by dipping EVOH in an acid solution. Further, Unexamined Japanese Patent Laid-Open Nos. 954/1977, 955/1977 and 41204/1981 disclose a method which comprises improving the melt-moldability by adding a metal salt on the ground that metal salts of some type have marked effects of thermal stabilization.

The above-mentioned processes all principally intend to decrease a time-dependent viscosity change in the melting operation, and can certainly give molded articles having good appearances When a short-period melt-molding is conducted. However, at a continuous melt molding over 24 hours or longer, gelled matters or streaky irregularities generate on the molded article, causing the obtained articles to have bad appearances and finally to be unusable.

The above-described phenomena take Place also when coextruding or co-injecting an EVOH With a hydrophobic thermoplastic resin. Examined Published Japanese Patent Application Nos. 2984/1985, 35125/1983 and 39548/1985 disclose a method which comprises co-extruding an EVOH with a hydrophobic thermoplastic resin and, interposed between the two, another thermoplastic resin modified with an ethylenically unsaturated carboxylic acid or its anhydride. The Process however has a drawback of the obtained multilayered structure gradually getting poor in its appearance.

SUMMARY OF THE INVENTION

An object of the Present invention is to Provide an EVOH composition which can Yield a molded article comprising no fish eyes or streaky irregularities even by a long-period melt molding.

To achieve the object stated above, the present invention provides an EVOH composition comprising a salt of a metal belonging to group II of the Periodic table in an amount converted to the metal of from 0.0005 to 0.05% by weight, an acidic substance having a pKa (acidity dissociation constant at 25° C.) of at least 3.5 and a boiling point under atmospheric Pressure of at least 180° C. in an amount of from 0.002 to 0.2% by weight, and a second acidic substance having a pKa of at least 3.5 and a boiling point under atmospheric Pressure of not higher than 120° C. in an amount of from 0.01 to 0.2% by weight; said composition having such flow characteristics that: in the relationship at at least one Point in temperatures 10 to 80° C. higher than the melting Point of the ethylene-vinyl alcohol copolymer, between the heating time and the extrusion rate measured With a capillary rheometer (Koka Flow Tester, available from Shimadzu Corp.), extrusion rate does not substantially increase for the initial 15 minutes, thereafter the extrusion rate at any heating time after 15 minutes until 2 hours is in a range of from 1/10 to 50 times that after the initial 15 minutes, and the extrusion rate at any time after 2 hours until 10 hours is at leas t once in a range of from 2 to 50 times that after the initial 15 minutes.

DETAILED DESCRIPTION OF PREFERRED EMBODIMENTS

In the present invention, the EVOH suited for obtaining an molded article having an excellent appearance is a saponified product of an ethylene-vinyl acetate copolymer, or a saponified product of an ethylene-vinyl acetate copolymer obtained by copolymerizing ethylene, vinyl acetate and an olefinicially unsaturated monomer as a third component in an amount not more than 10 mol% based on the amount of the vinyl acetate component, and by subsequently saponifying the resultant copolymer; and is preferably one containing ethylene in an amount of from 20 to 60 mol%, more preferably from 20 to 55 mol%, and having a saponification degree of vinyl acetate component of at least 95 mol%. If the ethylene content is less than 20 mol%, the molded article obtained therefrom will be Poor in its properties such as water resistance and hot water resistance, and the EVOH itself will readily gel, resulting in an increase in the number of fish eyes and streaks formed, thereby rendering the effect ©f the present invention difficult to be produced. If the ethylene content exceeds 60 mol% or the saponification degree is less than 95 mol%, the gas barrier properties of obtained molded articles Will be low, rendering the inherent characteristics of EVOH difficult to maintain.

EVOH is generally obtained by adding a caustic alkali or an alkali metal alcolate to an alcohol solution of an ethylene-vinyl acetate copolymer to effect saponification, and then removing by-produced sodium acetate and the like by Washing. However, if the obtained EVOH is melt-molded as it is, thermal decomposition occurs remarkably to decrease sharply its melt viscosity and to color, and hence the EVOH is not usable. It is well known that the moldability is improved by adding an acid, by dipping into an acid solution, by adding a metal salt combined with an acid, or the like. It has been said that, in particular, a Process which comprises, as mentioned above, adding an acid or a metal salt combined with an acid, as disclosed in Examined Published Japanese Patent Application No. 19242/1980 and Unexamined Japanese Patent Laid-Open Nos. 91988/1976, 954/1977, 955/1977 and 41204/1981, improves the moldability. This is true in the case of a short-Period melt molding, and the process gives an molded article having a good appearance and being less colored. However, in the case where a continuous melt molding is performed over more than 24 hours, as the running time becomes longer; for single molded articles there generate gelled matters or streaky irregularities; and for co-extruded or co-injected multilayered structures, particularly those comprising interlayer adhesive layers of ethylenically unsaturated carboxylic acid or its anhydride, there generates at the co-extrusion or co-injection, in addition to gelled matters, interfacial unstability, resulting in formation of a poor appearance with an overall wavy pattern. When this happens to a high degree, the overall irregularities grow and adjacent layers invade into each other, thereby forming holes or breakage. Even when the appearance is not so Poor, there often forms a minute Pattern like an overall satin-like finish or a streaky Pattern. When such a co-extruded article or co-injected article is further processed, the appearance is still more worsened and there generates a net-like pattern on the Whole surface. The wavy roughness or the matt Pattern on the surface of the co-extruded or co-injected article relates to the stability of a multi-layer flow When the flow is highly unstable, the wavy surface roughness generates; while When the flow is unstable to a minor extent, the matt pattern or streaks generate.

The present inventors have found that the worsening of the appearance of a molded article, Particularly one having a multilayered structure can be effectively Prevented by "preparing an EVOH such that it will exhibit a specific time-dependent viscosity change" and submitting the EVOH to melt molding at an appropriate temperature.

The present invention thus Provides an EVOH for melt molding, which has such flow characteristics that: when the time-dependent viscosity change of the EVOH is measured with a capillary rheometer (Koka Flow Tester), in the relationship between the heating time and the extrusion rate at at least one temperature in a range of from 10 to 80° C. higher than the melting point of the EVOH (by DSC (scanning speed: 10° C./min)); the extrusion rate does not substantially increase for the initial 15 minutes, thereafter the extrusion rate at any heating time after the initial 15 minutes until 2 hours is in a range of from 1/10 to 50 times that after the initial 15 minutes, and the extrusion rate at any time after 2 hours until 10 hours is at least once in a range of from 2 to 50 times that after the initial 15 minutes The extrusion rate measured With a capillary rheometer (Koka Flow Tester) herein means the value determined with a nozzle of 1 mm$\phi \times$ 10 mm$\phi$ and under a load of 10 kg.

The extrusion rate after 2 hours until 10 hours should be at least once in a range of from 2 to 50 times that after the initial 15 minutes, and preferably increases steadily in this time range as shown in FIG. 1. The extrusion rate in the initial 15 minutes does not substantially increase, rather preferably decreases, the decreasing ratio being preferably as low as Possible. For example, the extrusion rate after 15 minutes is preferably from 1/5 to 1, more Preferably from 3/5 to 1 that at the start (0 minute). BY submitting an EVOH having such flow characteristics to a melt molding, in particular to co-extrusion molding or co-injection molding with and a hydrophobic thermoplastic resin modified with an ethylenically unsaturated carboxylic acid or its anhydride, there can be obtained a molded article and a multilayered laminate having a good appearance with no irregularities caused by unstable interface, such as gelled matter, streaks, and matt surface. The reason is not clear, but may be estimated to lie in the flow characteristics of the EVOH composition and further in an interaction between the EVOH composition and the thermoplastic resin modified with an ethylenically unsaturated carboxylic acid or its anhydride.

The EVOH composition of the Present invention can be obtained for example by the following method.

That is, it can be obtained by treating an EVOH with (A) a salt(s) of a metal belonging to the group II of the periodic table, (B) an acidic substance having a pKa II of the periodic table, (B) an acidic substance having a pKa (acid dissociation constant at 25° C.) of at least 3.5 and a boiling Point under atmospheric pressure of at least 180° C., and (C) an acidic substance having a pKa of at least- 3.5 and a boiling Point under atmospheric pressure of not higher than 120° C.

Examples of the metals belonging to the group II of the periodic table for the metal salt(s) (A) are berilium (Be), magnesium (Mg), calcium (Ca), zinc (Zn) and barium (Ba); and examples of their salts include carbonates, acetates, sulfates, phosphates, and the like. Among these salts, calcium acetate and magnesium acetate are Preferred in view of controllability of the time-dependent viscosity change of EVOH and of color shade of the EVOH obtained. These metal salts may be used singly or in combinations of at last two.

Examples of the acidic substance having a pKa of at least 3.5 and a boiling Point under atmospheric Pressure of at least 180° C. (B) are organic acids such as succinic acid, adipic acid, benzoic acid, capric acid, citric acid, lauric acid, and the like; inorganic acidic substances such as boric acid, Potassium dihydrogen phosphate, sodium dihydrogen phosphate and the like; and, amino acids such as asparagic acid, aminobenzoic acid, glutamic acid and the like; but not limited thereto. Among these, acidic substances having boiling Points of at least 250° C. are Preferred. These substances may be used alone or in combinations of at least two.

Examples of the acidic substance having a pKa of at least 3.5 and a boiling Point under atmospheric pressure of not higher than 120° C. are acetoacetic acid, formic acid, acetic acid, and the like, among which acetic acid is preferred.

The above substances may be added to EVOH either by the direct addition thereof, followed by mixing, or by dipping EVOH into an aqueous solution prepared by dissolving them into water The incorporation ratios of the above substances in the EVOH are from 0.0005 to 0.05% by weight, preferably from 0.001 to 0.03% by weight converted into the weight of the Corresponding metal for the metal salt (A), from 0.002 to 0.2% by weight, preferably from 0.005 to 0.1% by weight for the acidic substance having a pKa of at least 3.5 and a boiling Point under atmospheric Pressure of at least 180° C. (B), and from 0.01 to 0.2% by weight, preferably from 0.02 to 0.1% by weight for the substance having a pKa ©f at least 3.5 and a boiling Point under atmospheric Pressure of not higher than 120° C. (C).

While it is Preferred that the EVOH do not contain sodium acetate by-Produced at saponification, the content thereof of about 0.05% by Weight does not impair the afore-described characteristics.

The incorporation ratios of the substances in EVOH are determined according to the following methods.

(1) Salt of a metal belonging to the group II of the Periodic table (A).

100 Parts of EVOH is put in a porcelain crucible and then burned in an electric furnace. The residual ash is dissolved in a N/100 aqueous nitric acid solution and the solution is submitted to an atomic absorption analysis to determine the metal of the metal salt.

(2) Acidic substances having pKa's of at least 3.5 and boiling Points under atmospheric pressure of not higher than 120° C. (C).

Solutes contained in EVOH are extracted with a solvent, and the acidic substance in the extract is determined by neutralization titration. Determination of representative acidic substances are given below.

Formic acid

A tight sealed container is filled with 100 parts of EVOH and 250 Parts of water, and the contents are heated with stirring at 95° C. for 3 hours to extract the formic acid in EVOH. Using a potassium permanganate solution as a titrating liquid, the formic acid in the extract is determined by oxidation-reduction titration.

Acetic acid (HOAc)

Acetic acid in EVOH is extracted with water in the same manner as for formic acid. Using an aqueous sodium hydroxide solution as a titrating liquid, the acetic acid in the extract is determined by neutralization titration.

(3) Acidic substances having pKa's of at least 3.5 and boiling points under atmospheric Pressure of at least 180° C. (B).

Solutes contained in EVOH are extracted with a solvent, and the acidic substance in the extract is determined by neutralization titration. Determination of representative acidic substances are given below

Succinic acid

The succinic acid in EVOH is extracted with water in the same manner as for formic acid. The extract is added with resorcinol and concentrated sulfuric acid, heated at 126 to 130° C., cooled, and then submitted to a determination by colorimetry.

Adipic acid

The adipic acid in EVOH is extracted with water in the same manner as for formic acid The extract is dried to solid, and the deposited adipic acid is dissolved in water, and the solution is submitted for neutralization titration to determine the adipic acid using an aqueous sodium hydroxide solution as a titrating liquid.

Benzoic acid

This is determined in a manner similar to that for adipic acid.

Capric acid

A tight sealed container is filled with 100 Parts of EVOH and 250 Parts of ethanol, and the content is heated with stirring at 80° C. for 5 hours to extract the capric acid in EVOH. Using an aqueous sodium hydroxide solution as a titrating liquid, the capric acid in the extract is determined by neutralization titration.

Lauric acid

This is determined in a manner similar to that for capric acid.

Succinic acid

The succinic acid in EVOH is extracted with water in the same manner as for formic acid. The extract is added with acetic anhydride and heated. The mixture is further added with pyridine, heated, cooled, and then submitted to determination by colorimetry.

Boric acid

Similar to the cases of analysis of the afore-mentioned metals, boric acid is determined by atomic absorption analysis.

Sodium dihydrogenphosphate

A tight sealed container is filled with 100 parts of EVOH and 250 parts of a 1 g/l aqueous solution of acetic acid, and the content is heated with stirring at 95° C. for 3 hours to extract the sodium dihydrogenphosphate in EVOH. The phosphate ion in the extract is determined by ion chromatography.

Potassium dihydrogenphosphate

This is determined in the same manner as for sodium dihydrogenphosphate.

Amino acids

The amino acid in EVOH is extracted with water in the same manner as for formic acid. The amino acid in the extract is determined by a known amino acid analysis For example, asparagic acid is determined by polarographic determination of the fumaric acid formed by treating the obtained extract with dimethyl sulfate.

The thus obtained EVOH is co-extruded or co-injected with a hydrophobic thermoplastic resin via a thermoplastic resin modified with an ethylenically unsaturated carboxylic acid or its anhydride. The melt viscosity of the EVOH changes depending on temperature, and the influences of the afore-mentioned substances contained in the EVOH on the melt viscosity of the EVOH also vary depending on temperature, and further the time-dependent change of the melt viscosity changes in a complex manner depending on the temperature. Selection of an appropriate molding temperature range therefore is necessary for achieving the afore-described specific time-dependent change.

The above-described EVOH used in this invention may, when submitted to melt molding, incorporate mixed therewith a conventional EVOH, for example one having an ethylene content different from the EVOH, other thermoplastic resin, additives such as a plasticizer, and the like, in amounts not to adversely affect the object of the Present invention.

Next, the hydrophobic thermoplastic resins used in co-extrusion molding or co-injection molding with the EVOH are explained. Preferred thermoplastic resins are polypropylene, polyethylene, ethylene-propylene copolymer, ethylene-vinyl acetate copolymer, thermoplastic polyesters such as polyethylene terephthalate, polyamides such as 6-nylon and 6,6-nylon, polystyrene, polyvinyl chloride, polycarbonate and the like. They may be used singly, as copolymers or in admixtures thereof. Particularly Preferred among these are polypropylene, polyethylene, ethylene-propylene copolymer, thermoplastic polyesters, polystyrene, or copolymers or mixtures thereof.

Interlayer adhesives are often used when the EVOH and the hydrophobic thermoplastic resin are co-extruded or co-injected. As the interlayer adhesive, thermoplastic resins modified with an ethylenically unsaturated carboxylic acid or its anhydride are preferred. In view of the adhesivenesses with the EVOH layer and with the hydrophobic thermoplastic resin layer, the interlayer adhesive is preferably a carboxyl-group containing modified olefin polymer comprising an olefin polymer chemically bonded (e.g. by addition reaction or by grafting) with an ethylenically unsaturated carboxylic acid or its anhydride. The olefin polymer herein is a polyolefin such as polyethylene (low Pressure, medium pressure or high pressure polyethylene), linear low density polyethylene, polypropylene or polybutene; a copolymer of olefin with a comonomer copolymerizable with the olefin (e.g vinyl ester, unsaturated carboxylic acid ester, or the like) such as ethylene-vinyl acetate copolymer or ethylene-ethyl acrylate copolymer; or the like. Among the above preferred are ethylene-vinyl acetate copolymer (containing from 5 to 55% by weight of vinyl acetate) and ethylene-ethyl acrylate copolymer (containing from 8 to 35% by weight of ethyl acrylate).

The ethylenically unsaturated carboxylic acid or its anhydride herein means an ethylenically unsaturated monocarboxylic acid, its ester, an ethylenically unsaturated dicarboxylic acid, its mono- or diester, its anhydride, among which ethylenically unsaturated dicarboxylic acid anhydride is preferred. More concretely, mentions are made of maleic acid, fumaric acid, itaconic acid, maleic anhydride, itaconic anhydride, monomethyl maleate, monoethyl maleate, diethyl maleate, monomethyl fumarate and the like, among Which maleic anhydride is most preferred.

The amount of the ethylenically unsaturated carboxylic like, among which maleic anhydride is most preferred.

The amount of the ethylenically unsaturated carboxylic acid or its anhydride added or grafted to the olefin polymer (modification amount) is from 0.01 to 15% by weight, preferably from 0.02 to 10% by weight based on the weight of the olefin polymer. The addition or grafting of the ethylenically unsaturated carboxylic acid or its anhydride to the olefin polymer is conducted, for example, in the Presence of a solvent such as xylene and a catalyst such as Peroxide by radical polymerization or the like. The Ml measured according to ASTM-D-1238-65T at 190° C. of the thus obtained carboxyl-group containing modified polyolefin is 0.2 to 30 g/10 min, preferably 0.5 to 10 g/min. The adhesive resins may be used sin9ly or in admixtures of more than two.

The co-extrusion of the EVOH with the hydrophobic thermoplastic resin may be performed by a multi-manifold confluence T-die method, by a feed-block confluence T-die method, or by inflation.

The thus obtained co-extrusion molded articles may be subjected to a secondary Processing to give various molded articles such as films, sheets, tubes and bottles; for example:

(1) multilayered molded articles such as sheets and films are monoaxially or biaxially drawn and heat-treated into multilayered co-drawn sheets and films, (2) multilayered molded articles such as sheets and films are rolled into multilayered rolled sheets and films, (3) multilayered molded articles such as sheets and films are vacuum formed, pressure formed, vacuum-pressure formed, or isothermally molded into multilayered trays and cup-shaped containers, and (4) multilayered molded articles such as pipes are stretch-blow molded or by a similar process into bottles or cup-shaped containers.

The secondary processing methods are not limited to the above, but any known Processing other than the above (e.g. below molding) may be employed.

Examples of the layer construction of the co-extruded laminates are, when the thermoplastic resin modified with an ethylenically unsaturated carboxylic acid or its anhydride is expressed as Ad, and the hydrophobic thermoplastic resins as P and P', EVOH/Ad/p, p/Ad/EVOH/Ad/P, P/P'/Ad/EVOH/Ad/P, P/Ad/EVOH/Ad/P'/P and the like, wherein each layer may be a single layer or, as occasions demand, a multilayer. The hydrophobic resin layer P' may be a layer of its blend with EVOH and/or Ad.

The thus obtained co-extruded laminates are, since they have excellent appearances and gas barrier properties, best suited for materials for food containers such as deep-drawn containers, cup-shaped containers and bottles.

The co-injection can be Performed by any known co-injection Process. Also a multilayered preform can be obtained by a known Process as disclosed in Unexamined Japanese Patent Laid-Open No. 152412/1986, which comprises injecting continuously and successively resins (P, Ad and EVOH), which resins have been melted by one time clamping operation, into a single preform mold through three injection cylinders. The then layer construction are, for example, P/Ad/EVOH/Ad/P, P/Ad/EVOH/Ad/P/Ad/EVOH/Ad/P, and the like. Or, a multilayered preform or hollow container can be formed by a co-injection molding or a co-injection blow-molding using a co-injection nozzle shown in Unexamined Japanese Patent Laid-Open No. 34819/1985.

In the above co-injection moldings, same as in the case of co-extrusion, the use of a conventional EVOH will cause, besides generation of gels, an unstable interfacial unstability at interfaces where the EVOH layer and the interlayer adhesive resin layer, particularly an adhesive resin comprising a thermoplastic resin modified with an ethylenically unsaturated carboxylic acid or its anhydride joins (i.e in hot runner nozzle or at the inside of a preform mold). The interfacial unstability then causes a Poor wavy appearance, interinvasion of the adjacent layers, other poor appearances such as matt surface and streaky surface, thereby rendering the molded articles of high commercial values impossible to obtain. The EVOH prepared according to the Present invention, however, when melt molded at an appropriate temperature can effectively prevent the worsening of the appearance. The reason is thought to be similar to that in the case of co-extrusion.

Hereinbelow the present invention will be further explained with reference to Examples, wherein "parts" or "%" means "parts by weight" or "% by weight" unless otherwise specified.

EXAMPLES

Example 1

A solution containing 45 parts of an ethylene-vinyl acetate copolymer having an ethylene content of 38 mol%, 50 parts of methanol and 1 part of sodium hydroxide was subjected to saponification for 40 minutes at 110° C. and under a Pressure of 3.5 kg/cm$^2$G, while methanol vapor was being blown thereinto. The methyl acetate formed during the reaction was, together with a portion of the methanol, removed out of the system by distillation. The obtained saponified reaction mixture (saponification degree: 99.3 mol%) Was extruded through a die having a hole of 2 mm diameter into a mixed solvent of 10% of methanol and 90% of water at 5° C. to coagulate therein into a strand, and the coagulate was cut with a cutter to give Pellets. The Pellets were washed three times each time with 10 Parts of ion-exchanged water based on 1 Part of the Pellets, and then dipped in an aqueous solution comprising 100 Parts of ion-exchanged water containing 0.1% of acetic acid, 0.01% of benzoic acid, 0.03% of calcium acetate and 0.01% of magnesium acetate, for 3 hours. After being dipped, the Pellets were dewatered and dried. The Pellets after drying contained 0.1% of moisture, 0.06% of acetic acid, 0.016% of benzoic acid, 0.015% of calcium and 0.0025% of magnesium. The melt index (190° C., under a load of 2160 g) and the melting point of the pellets was 2.5 g/10 min and 176° C. respectively. The relationship between the heating time at 220° C. and the extrusion rate of the Pellets was determined with a capillary rheometer (Koka Flow Tester) to give a result roughly shown in FIG. 1, and the extrusion rates at Points in FIG. 1 were as shown in Table 1.

TABLE 1

| Point | Heating time (hr) | Extrusion rate (cm³/sec) |
|---|---|---|
|   | 0 | $2.5 \times 10^{-3}$ |
| A | 0.25 | $2.0 \times 10^{-3}$ |
| B* | 1.75 | $0.5 \times 10^{-3}$ |
| C | 2 | $0.6 \times 10^{-3}$ |
| D | 5 | $5.1 \times 10^{-3}$ |

*B is a point where the extrusion rate is minimum between points A and C.

The pellets were extruded at 220° C. into a film having a thickness of 20 μ (extruder: 20 mmφ, L/D=25, die: T-die, 200 mm wide). A continuous running over 150 hours was performed, during Which formed in the film were no streaks and only 0.1 to 0.3 Pieces/m² of visible gel-like fish eyes (small-block defects resembling fish eyes). The number of the fish eyes did not increase with time.

Separately, the Pellets were co-extruded into a multi-layered film comprising the EVOH as an intermediate layer, a polyethylene modified with maleic anhydride (contents of maleic anhydride and vinyl acetate: 0.5 wt% and 20 wt% respectively, MI: 1.8 g/10 min) as adhesive layers, and a low density polyethylene as inner and outer layers. The film construction was low density polyethylene/adhesive resin/EVOH/adhesive resin/low density polyethylene {thicknesses: 40 μ/5 μ/20 μ/5 μ/40 (total 110 μ)}. The film forming conditions were as follows.

A 60 mm-φ extruder, two 40 mm-φ extruders and two 65 mm-φ extruders were used for the EVOH, the adhesive resin and the low density polyethylene respectively. The die confluence system was one with a feed block (600 mm wide), the die temperature and the cooling roll temperature were 220° C. and 50° C., take-up speed was 10 m/min, and the EVOH resin temperature was 220° C. A continuous operation over 150 hours was performed, during Which formed in the film Were no streaks and only 0.1 to 0.3 pieces/m² of visible gel-like fish eyes. The number of the fish eyes did not increase with time. The sheet had a good appearance with no Wavy pattern.

Reference Example 1

EVOH pellets were obtained in the same manner as in Example 1 from an EVOH containing 38 mol% of ethylene and having a saponification degree of 99.3 mol%. One part of the Pellets was washed three times each time with 10 Parts of ion-exchanged water containing 0.05% of acetic acid and then dipped for 3 hours in 20 Parts of ion.-exchanged water containing 0.02% of adipic acid and 0.01% of calcium acetate. After being dipped, the Pellets were dewatered and dried. After the drying, the Pellets contained 0.1% of moisture, 0.005% of acetic acid, 0.03% of adipic acid and 0.005% of calcium.

The extrusion rates with time were measured using a capillary rheometer (Koka Flow Tester) to give results shown in Table 2. The extrusion rate steadily decreased with time. The tendency was similar to that shown in FIG. 1.

TABLE 2

| Heating time (hr) | 0 | 0.25 | 2 | 4 |
|---|---|---|---|---|
| Extrusion rate ($10^{-3}$cm³/sec) | 1.5 | 1.2 | 0.5 | 0.28 |
| Heating time (hr) | 6 | 8 | 10 | |
| Extrusion rate ($10^{-3}$cm³/sec) | 0.20 | 0.18 | 0.15 | |

The pellets were co-extruded into a multi-layered film Comprising the EVOH as an intermediate layer, a polyethylene modified with maleic anhydride as adhesive layers, and a low density polyethylene as inner and outer layers, at a die temperature and resin temperature of both 200° C. with the same apparatus and in the same conditions as in Example 1. Then, after 20 hours after the start up, gel-like fish eyes generated vigorously in the EVOH layer as shown in Table 3, and the operation had to be stopped after 48 hours. Wavy irregularities had been formed on the surface from the start up until the stoppage.

TABLE 3

| Running time (hr) | 5 | 10 | 15 | 20 | 30 | 40 | 48 |
|---|---|---|---|---|---|---|---|
| No. of fish eyes (pcs/m²) | 0.2 | 0.1 | 0.5 | 1.1 | 3.5 | 6.0 | 11 |

Reference Example 2

An ethylene-vinyl acetate copolymer was saponified, and the saponified product was coagulated, cut, and washed in the same manner as in Example 1. One Part of the pellets was dipped for 3 hours in 100 parts of ion-exchanged Water containing 0.15% of acetic acid, then dawatered and dried. The pellets after the drying contained 0.11% of moisture, 0.09% of acetic acid, 0.0005% of calcium and not more than 0.0001% of magnesium. Measurement of the extrusion-rate change With time using a capillary rheometer (Koka Flow Tester) at 220° C. gave results shown in Table 4, showing that the extrusion rate decreased steadily with time.

TABLE 4

| Heating time (hr) | 0 | 0.25 | 2 | 4 |
|---|---|---|---|---|
| Extrusion rate ($10^{-3}$cm³/sec) | 2.4 | 2.2 | 0.65 | 0.40 |
| Heating time (hr) | 6 | 8 | 10 | |
| Extrusion rate ($10^{-3}$cm³/sec) | 0.21 | 0.12 | 0.08 | |

With the same apparatus and film construction as in Example 1, co-extrusion film formation was conducted at a die temperature and a resin temperature of both 220° C. Fish eyes were formed with time as shown in Table 5. The operation was stopped 20 hours after the start up.

TABLE 5

| Running time (hr) | 3 | 6 | 9 | 15 | 20 |
|---|---|---|---|---|---|
| No. of fish eyes (pcs/m²) | 0.2 | 0.4 | 1.1 | 7.2 | 15 |

Wavy irregularities in the EVOH layer generated just after the start up and continued generating until the stoppage.

EXAMPLE 2

An ethylene-propylene-vinyl acetate copolymer containing 29 mol% of ethylene and 1 mol% of propylene was saponified, and the saponified product was coagulated and cut in the same manner as in Example 1 to give pellets. One Part of the thus obtained pellets was washed twice each time with 15 parts of ion-exchanged water, and then dipped for 3 hours in 100 parts of ion-exchanged water containing 0.05% of acetic acid, 0.02% of sodium dihydrogenphosphate, 0.02% of calcium acetate and 0.01% of magnesium acetate. The pellets were then dewatered and dried. The dried pellets had a saponification degree of 99.4 mol%, a melt index of 1.2 g/10 min and a melting point of 177° C. The pellets contained 0.09% of moisture, 0.03% of acetic acid, 0.04% of sodium dihydrogenphosphate, 0.01% of calcium and 0.0025% of magnesium. Measurement of the relationship between heating time and the extrusion rate at 230° C. using a capillary rheometer (Koka Flow Tester) gave results similar to those shown in FIG. 1. The extrusion rates at Points in FIG. 1 were as given in Table 6.

TABLE 6

| Point | Heating time (hr) | Extrusion rate (cm³/sec) |
|---|---|---|
|  | 0 | 1.9 × 10⁻³ |
| A | 0.25 | 1.6 × 10⁻³ |
| B* | 0.75 | 0.8 × 10⁻³ |
| C | 2 | 8.5 × 10⁻³ |
| D | 3 | 8.2 × 10⁻³ |

*B is a point where the extrusion rate is minimum between points A and C.

A film formation by tubular film co-extrusion was conducted with the EVOH Pellets, a low density polyethylene (Melt index (MI) measured according to ASTM-D1238: 1.2 g/10 min; hereinafter referred to as LDPE) and a polyethylene modified with maleic anhydride (MI: 1.8 g/10 min, degree of modification with maleic anhydride: 0.5 wt%, and content of vinyl acetate: 20 wt%) to obtain a film having a thickness of 110 μ. Various conditions employed were as given below.

1. Film construction

Outer LDPE (20 μ)/adhesive resin (10 μ)/EVOH (20 μ) adhesive resin (10 μ)/inner LDPE (50 μ); (total 110 μ)

2. Equipment

| (1) LDPE | 65 mmφ extruder, L/D = 22 |
|---|---|
| (2) Adhesive resin | 40 mmφ extruder, L/D = 22 |
| (3) EVOH | 60 mmφ extruder, L/D = 28 |
| (4) Die (3 kind/5 layer circular die) | 75 mmφ |

3. Extrusion conditions

| (1) Temperature of 65 mmφ extruder: | 230° C. |
|---|---|
| (2) Temperature of 40 mmφ extruder: | 220° C. |
| (1) Temperature of 60 mmφ extruder: | 230° C. |
| (1) Resin temperature: | 230° C. |

A continuous operation was carried out over 120 hours, during which no streaks or wavy irregularities generated in the film. Fish eyes generated only in small amounts, and the film surface was clean. The generation of the fish eyes With time were as shown in Table 7.

TABLE 7

| Running time (hr) | 24 | 48 | 72 | 96 | 120 |
|---|---|---|---|---|---|
| No. of fish eyes (pcs/m²) | 0.2 | 0.1 | 0.3 | 0.5 | 0.5 |

EXAMPLES 3 THROUGH 9

Example 1 was repeated except that the conditions of treatment with acidic substances and metal salts were changed, to obtain pellets of EVOH's, analysis data of which are shown in Column A of Table 10. They exhibited time-dependent viscosity changes as shown in Column B of Table 10. These pellets were molded into films with the same 5-layer film-forming equipment of co-extrusion feed block confluence type as that used in example 1. The film forming Conditions and results of evaluation on the films are shown in Column C of Table 10. All the films had good appearances with no wavy Patterns.

REFERENCE EXAMPLE 3

An ethylene-propylene-vinyl acetate copolymer was saponified, and the saponified Product was coagulated, cut, and washed in the same manner as in Example 2. One Part of the pellets Was dipped for 3 hours in 150 parts of ion-exchanged water containing 0.02% of adipic acid, then dewatered and dried. The pellets after the drying contained 0.09% of moisture, 0.03% of adipic acid, 0.0007% of calcium and not more than 0 0001% of magnesium. Measurement of the extrusion-rate change with time using a capillary rheometer (Koka Flow Tester) at 230° C. gave results shown in Table 8, showing that the extrusion rate decreased steadily with time.

TABLE 8

| Heating time (hr) | 0 | 0.25 | 2 | 4 |
|---|---|---|---|---|
| Extrusion rate (10⁻³cm³/sec) | 2.1 | 1.8 | 1.1 | 0.55 |
| Heating time (hr) | 6 | 8 | 10 | |
| Extrusion rate (10⁻³cm³/sec) | 0.19 | 0.08 | 0.05 | |

With the same equipment, the film construction and the conditions (i.e. resin temperature: 230° C.) as those in Example 2, co-extrusion film formation was conducted. The number of fish eyes formed increased with time. (Table 9)

TABLE 9

| Running time (hr) | 2 | 4 | 6 | 8 | 10 |
|---|---|---|---|---|---|
| No. of fish eyes (pcs/m²) | 0.1 | 0.3 | 0.7 | 2.9 | 8.0 |

The film had a bad appearance with wavy irregularities.

TABLE 10

| A |||
|---|---|---|
| Analysis results of pellet |||
| (C) | (B) | |

TABLE 10-continued

| | Acidic substance having a b.p. of ≦ 120° C. | Acidic substance having a b.p. of ≦ 180° C. | Time-dependent change | | | B | | | | |
|---|---|---|---|---|---|---|---|---|---|---|
| | | | (A) Metal salt (substance) | | Temp | Extrusion rate ($10^{-3} \times cm^3/sec$) at each point in FIG. 1 | | | | |
| Ex. No. | (substance) % | (substance) % | (metal %) | metal % | °C. | | A | B* | C | D |
| 3 | (HOAc) 0.08 | (Adipic acid) 0.01 | (Ca-acetate) 0.012 | (Mg-acetate) 0.002 | 220 | 0 2.4 | 0.25 2.0 | 2 0.55 | 2 0.55 | 7 6.1 |
| 4 | (Formic acid) 0.01 | (KH$_2$PO$_4$) 0.012 (PO$_4^{3-}$) 0.012 | (Ca-acetate) 0.012 | (Mg-sulfate) 0.002 | 230 | 0 3.2 | 0.25 2.8 | 1.25 0.71 | 2 1.7 | 4 10 |
| 5 | (HOAc) 0.03 | (Adipic acid) 0.02 | (Ca-acetate) 0.015 | (Zn-acetate) 0.002 | 225 | 0 2.5 | 0.25 2.2 | 1.5 0.65 | 2 0.91 | 6 5.0 |
| 6 | (HOAc) 0.06 | (Benzoic acid) 0.01 | (Ca-acetate) 0.01 | (Ba-acetate) 0.0015 | 240 | 0 5.2 | 0.25 4.2 | 1 0.92 | 2 5.3 | 3 20 |
| 7 | (HOAc) 0.02 | (KH$_2$PO$_4$) 0.02 (PO$_4^{3-}$) 0.015 | (Ca-acetate) | (Mg-acetate) 0.0015 | 210 | 0 1.7 | 0.25 1.4 | 2 0.45 | 2 0.45 | 8 5.4 |
| 8 | (Formic acid) 0.01 | (NaH$_2$PO$_4$) 0.01 (PO$_4^{3-}$) 0.012 | (Ca-acetate) | (Zn-acetate) 0.002 | 205 | 0 1.0 | 0.25 0.9 | 1.25 0.56 | 2 0.82 | 6 3.8 |
| 9 | (HOAc) 0.04 | (Asparagic acid) 0.02 | (Ca-acetate) 0.015 | (Mg-acetate) 0.002 | 225 | 0 2.4 | 0.25 2.2 | 1.75 0.6 | 2 0.71 | 6.5 4.7 |

| | C Film formation | | | | |
|---|---|---|---|---|---|
| | Temperature condition (°C.) | | | | |
| Ex. No. | LDPE 65φ EXT.** | Ad 40φ EXT. | EVOH 60φ EXT. | Hours run | No. of fisheyes in EVOH layer /m² | Appearance |
| 1 | 220 | 220 | 220 | 144 | 0.4 | Good |
| 2 | 230 | 220 | 230 | 120 | 0.6 | " |
| 3 | 225 | 220 | 225 | 96 | 0.3 | " |
| 4 | 240 | 220 | 240 | 96 | 0.4 | " |
| 5 | 210 | 210 | 210 | 144 | 0.3 | " |
| 6 | 205 | 205 | 205 | 144 | 0.4 | " |
| 7 | 225 | 220 | 225 | 96 | 0.3 | " |

*B is a point where the extrusion rate is minimum between points A and C.
**EXT stands for extruder.

REFERENCE EXAMPLES 4 THROUGH 7

Example 1 was repeated except that the conditions of treatment with acidic substances and metal salts were changed, to obtain Pellets of EVOH's, analysis data of which are shown in Column A of Table 11. They exhibited time-dependent viscosity changes shown in Column B of Table 11. These pellets were molded into films with the same film forming equipment, conditions and film constructions as those in Example 1. The results of evaluation ⓒn the films are shown in Column C of Table 11.

TABLE 11

| | A Analysis results of pellet | | | | B Time-dependent change | | | | | | | |
|---|---|---|---|---|---|---|---|---|---|---|---|---|
| | (C) Acidic substance having a b.p. of | (B) Acidic substance having a b.p. of | (A) Metal salt (substance) | | | Time hr Extrusion rate ($10^{-3} \times cm^3/sec$) | | | | | | |
| Ref. Ex. No. | ≦ 120° C. (substance) % | ≦ 180° C. (substance) % | (metal %) | metal % | Temp °C. | 0 | 0.25 | 2 | 4 | 6 | 8 | 10 |
| 4 | (HOAc) 0.22 | (KH$_2$PO$_4$) 0.01 (PO$_4^{3-}$) | (Ca-acetate) 0.002 | — | 220 | 2.5 | 2.2 | 0.82 | 0.60 | 0.41 | 0.27 | 0.12 |
| 5 | (NOAc) 0.08 | (KH$_2$PO$_4$) ≦ 0.001 (PO$_4^{3-}$) | (Ca-acetate) 0.002 | (Mg-acetate) ≦ 0.0001 | 240 | 4.7 | 4.1 | 1.5 | 0.45 | 0.12 | 0.05 | 0.02 |
| 6 | (Formic acid) 0.03 | (Adipic acid) 0.02 | (Ca-acetate) 0.0004 | (Mg-sulfate) ≦ 0.0001 | 215 | 1.9 | 1.7 | 1.1 | 0.81 | 0.52 | 0.31 | 0.09 |
| 7 | (Formic acod) 0.02 | (Adipic acid) ≦ 0.001 | (Ca-acetate) 0.004 | (Zn-Acetate) 0.0005 | 220 | 2.4 | 2.2 | 0.90 | 0.65 | 0.42 | 0.25 | 0.12 |

TABLE 11-continued

| | C Film formation | | | | | |
|---|---|---|---|---|---|---|
| | Temperature condition (°C.) | | | No. of fish-eyes in EVOH layer | | |
| Ref. Ex. No. | LDPE 65φ EXT. | Ad 40φ EXT. | EVOH 60φ EXT. | Hours run | No. of fish-eyes/m² | Ap. |
| 4 | 220 | 220 | 220 | 10 | 0.4 | bad |
| | | | | 20 | 4.1 | |
| | | | | 30 | 12 | |
| 5 | 240 | 220 | 240 | 5 | 0.5 | " |
| | | | | 10 | 6.0 | |
| | | | | 15 | 14 | |
| 6 | 215 | 215 | 215 | 10 | 0.4 | " |
| | | | | 20 | 7.0 | " |
| | | | | 30 | 21 | |
| 7 | 220 | 220 | 220 | 10 | 0.5 | " |
| | | | | 20 | 6.5 | |
| | | | | 30 | 20 | |

Notes:
LDPE: Low density polyethylene
Ad: Adhesive resin
Ap.: Appearance

EXAMPLE 10

A multilayered sheet Was co-extruded using the same equipment as that in Example 1 with the EVOH Pellets for the intermediate layer, a polyethylene terephthalate (pET) as inner and outer layers and an ethylene-vinyl acetate copolymer modified with maleic anhydride as an adhesive resin. The molding conditions were as given below.

1. Film construction
Outer PET/adhesive resin/EVOH/adhesive resin-/inner PET = 40 μ/12 μ/80 μ/12 μ/40 μ (total: 184 μ)

2. Resins used
EVOH: one obtained in Example 1
PET a polyethylene terephthalate resin having an inherent viscosity [η] of 0.72 dl/g as determined at 30° C. on a solution thereof dissolved in a mixed solvent of 50 wt% of Phenol and 50 wt% of tetrachloroethane.
Adhesive resin: an ethylene-vinyl acetate copolymer modified with maleic anhydride (content of vinyl acetate: 24 mol%, degree of modification with maleic anhydride: 1.8 wt%)

3. Equipment

| (1) PET | 65 mmφ extruder, L/D = 22 |
|---|---|
| (2) Adhesive resin | 40 mmφ extruder, L/D = 22 |
| (3) EVOH | 60 mmφ extruder, L/D = 28 |
| (4) Die (3 kind/5 layer feed block type) | 600 mm wide |

4. Extrusion conditions

| (1) Temperature of 65 mmφ extruder: | 280° C. |
|---|---|
| (2) Temperature of 40 mmφ extruder: | 220° C. |
| (3) Temperature of 60 mmφ extruder: | 225° C. |
| (1) Resin temperature: | 250° C. |

A continuous operation was conducted over 120 hours. During the operation, no streaks were formed on the film, and the number of gel-like fish eyes in the EVOH layer was 0.1 to 0.3 Pieces/m², showing no tendency of increase with time. The film appearance was good.

EXAMPLE 11

An ethylene-vinyl acetate copolymer containing 32 mol% of ethylene was saponified, and the saponified Product was coagulated and cut in the same manner as in Example 1 to give pellets (melting point: 181° C.). One Part of the Pellets was washed twice each time with 10 Parts of ion-exchanged water, then dipped for 4 hours in 100 Parts of ion-exchanged water containing 0.03% of acetic acid, 0.02% of benzoic acid, 0.015% of calcium acetate and 0.01% of zinc acetate, and thereafter dewatered and dried. The Pellets after the drying had a saponification degree of 99.5 mol% and a melt index of 1 3 g/10 min, and contained 0.15% of moisture, 0.01% of acetic acid, 0.03% of benzoic acid, 0.008% of calcium and 0.004% of zinc.

The extrusion rates were measured at 250° C. with various heating times using a capillary rheometer (Koka Flow Tester). The relationship between the heating time and the extrusion rate was of a type similar to that shown in FIG. 1. The extrusion rates corresponding to the Points in FIG. 1 were as shown in Table 12.

TABLE 12

| Point | Heating time (hr) | Extrusion rate (cm³/sec) |
|---|---|---|
| A | 0 | $6.1 \times 10^{-3}$ |
| | 0.25 | $4.7 \times 10^{-3}$ |
| B* | 0.85 | $2.1 \times 10^{-3}$ |
| C | 2 | $9.2 \times 10^{-3}$ |
| D | 3 | $30 \times 10^{-3}$ |

*B is a point where the extrusion rate is minimum between points A and C.

A Polyethylene terephthalate. resin (inherent viscosity [η] = 0.85 dl/g, melting point: 265° C.), the EVOH obtained above and an ethylene-vinyl acetate copolymer modified with maleic anhydride (contents of vinyl acetate and maleic anhydride: 24 wt% and 1.1 wt% respectively) as an adhesive resin were separately fed through three extruders, the extrusion temperatures being 250° C. for the EVOH resin, 278° C. for the polyethylene terephthalate resin (pET) and 250° C. for the adhesive resin, to a multilayered cylindrical die to join together therein, with the resin temperatures at the die of 280° C. for PET and 250° C. for the EVOH resin and the adhesive resin, to be extruded into a 3 kind/5 layer Pipe having a construction of outer PET/adhesive resin/EVOH/adhesive resin/inner PET=1.0 mm/0.1 mm/0.3 mm/0.1 mm/2.0 mm (to thickness: 3.5 mm), and an outer pipe diameter of 25.0 mm.

A continuous operation was conducted over 120 hours. No streaks or gelled matters were formed, and a multilayer pipe having a good appearance was obtained.

The thus obtained multilayered pipe was cut to 13.0 cm. The cut Piece was sealed at one end and Provided on another end with a neck capable of mounting a cap, to form a multilayered preform. The preform obtained Was heated to 105° C. and biaxially-draw blown by elongation using an extension rod and by air-blowing into a multilayered bottle having a capacity of 1 liter. The thus obtained multilayered bottle was, being excellent in carbon dioxide gas barrier property, well suited for a container for carbonated drinks.

REFERENCE EXAMPLE 8

An ethylene-vinyl acetate copolymer containing 32 mol% of ethylene was saponified, and the saponified Product was coagulated and cut in the same manner as in Example 1 to give Pellets. One Part of the Pellets was washed twice each time with 10 parts of ion-exchanged water, then dipped for 4 hours in 100 Parts of ion-exchanged water containing 0.03 of acetic acid, and thereafter dewatered and dried. The Pellets after the drying had a saponification degree of 99.5 mol% and a melt index of 1.3 g/10 min, and contained 0.15% of moisture and 0.01% of acetic acid.

The extrusion rates were measured at 250° C. with various heating times using a capillary rheometer (Koka Flow Tester) to give the results shown in Table 13.

TABLE 13

| Heating time (hr) | 0 | 0.25 | 2 | 4 |
|---|---|---|---|---|
| Extrusion rate ($10^{-3} cm^3$/sec) | 6.1 | 5.2 | 2.4 | 1.1 |
| Heating time (hr) | 6 | 8 | 10 | |
| Extrusion rate ($10^{-3} cm^3$/sec) | 0.51 | 0.22 | 0.07 | |

A polyethylene terephthalate resin (inherent viscosity $[\eta]$ =0.85 dl/g, melting point: 265° C.), the EVOH obtained above and an ethylene-vinyl acetate copolymer modified with maleic anhydride (contents of vinyl acetate and maleic anhydride: 24 wt% and 1.1 wt% respectively) as an adhesive resin were extruded through the same equipment and under the same conditions as those in Example 11 into a 3 kind/5 layer pipe having a construction of outer PET/adhesive resin/EVOH/adhesive resin/inner PET =1.0 mm/0.1 mm/0.3 mm/0.1 mm/2.0 mm (total wall thickness: 3.5 mm), and an outer pipe diameter of 25.0 mm After 3 hours after the start up, streaks began to generate and became more remarkable With progress of time, thus forcing the operation to be. stopped after 6 hours. A 1-liter multilayered bottle was prepared by blow molding a multilayered Preform obtained from the pipe. However, a bottle having a good appearance could not be obtained because of generation of streaks.

EXAMPLE 12

Dry pellets having a melting point of 181° C. and other properties shown below were prepared from an ethylene-vinyl acetate copolymer containing 32 mol% of ethylene in the same manner as in Example 1.

| Saponification degree | 99.3 mol % |
|---|---|
| Melt index | 4.8 g/10 min |
| Content of acetic acid | 0.02% |
| Content of benzoic acid | 0.02% |
| Content of calcium | 0.006% |
| Content of magnesium | 0.002% |

Measurement of the relationship between the heating time and the extrusion rate at 260° C. with a capillary rheometer (Koka Flow Tester) gave results similar to those shown in FIG. 1, and the extrusion rates corresponding to the Points in FIG. 1 were as shown in Table 14.

TABLE 14

| Point | Heating time (hr) | Extrusion rate (cm$^3$/sec) |
|---|---|---|
| | 0 | 41 × 10$^{-3}$ |
| A | 0.25 | 25 × 10$^{-3}$ |
| B* | 0.6 | 9.8 × 10$^{-3}$ |
| C | 2 | 18 × 10$^{-3}$ |
| D | 4 | 60 × 10$^{-3}$ |

*B is a point where the extrusion rate is minimum between points A and C.

A PET having an inherent viscosity $[\eta]$ =0.73 dl/g, and a melting Point of 258° C., the EVOH obtained above and an ethylene-vinyl acetate copolymer modified with maleic anhydride ( melt index: 4.0 g/10 min; contents of vinyl acetate and maleic anhydride: 24 wt% and 1.1 wt% respectively) as an adhesive resin (Ad) were extruded through a co-injection equipment comprising three injection cylinders and a single preform die into a 3 kind/5 layer preform having a construction of pET/Ad/EVOH/Ad/PET =1.0 mm/0.1 mm/0.3 mm/0.1 mm/2.0 mm (average wall thicknesses at body), and an outer diameter mm (average wall thicknesses at body), and an outer diameter and a length of 25.0 mm and 130 mm respectively. A continuous operation was conducted over 120 hours. No streaks or gelled matters were formed, and a Preform having a good appearance was obtained. The thus obtained Preform was heated to 105° C. and biaxially-draw blown by elongation using an extension rod and by air blowing, into a multilayered bottle having a capacity of 1 liter. The thus obtained multilayered bottle Was, being excellent in both carbon dioxide gas barrier property and oxygen gas barrier property, well suited for containers for various drinks.

REFERENCE EXAMPLE 9

An EVOH of the following characteristics was prepared.

| Ethylene content | 32 mol % |
|---|---|
| Saponification degree | 99.3 mol % |
| Melt index | 4.8 g/10 min |
| Content of Acetic acid | 0.01% |

The extrusion rates were measured at 250° C. with various heating times using a capillary rheometer (Koka Flow Tester) to give the results shown in Table 15.

TABLE 15

| Heating time (hr) | 0 | 0.25 | 2 | 4 |
|---|---|---|---|---|
| Extrusion rate ($10^{-3} cm^3$/sec) | 41 | 20 | 9.5 | 5.2 |
| Heating time (hr) | 6 | 8 | 10 | |
| Extrusion rate ($10^{-3} cm^3$/sec) | 1.9 | 0.08 | 0.04 | |

A multilayered preform was molded by co-injection with the same Equipment and the same conditions as those in Example 12. After 4 hours after the start of the molding, streaks increased in number and the then preform was biaxially draw-blown into a bottle of 1-liter capacity, which was Poor in its appearance because of streaks.

Figure 1:
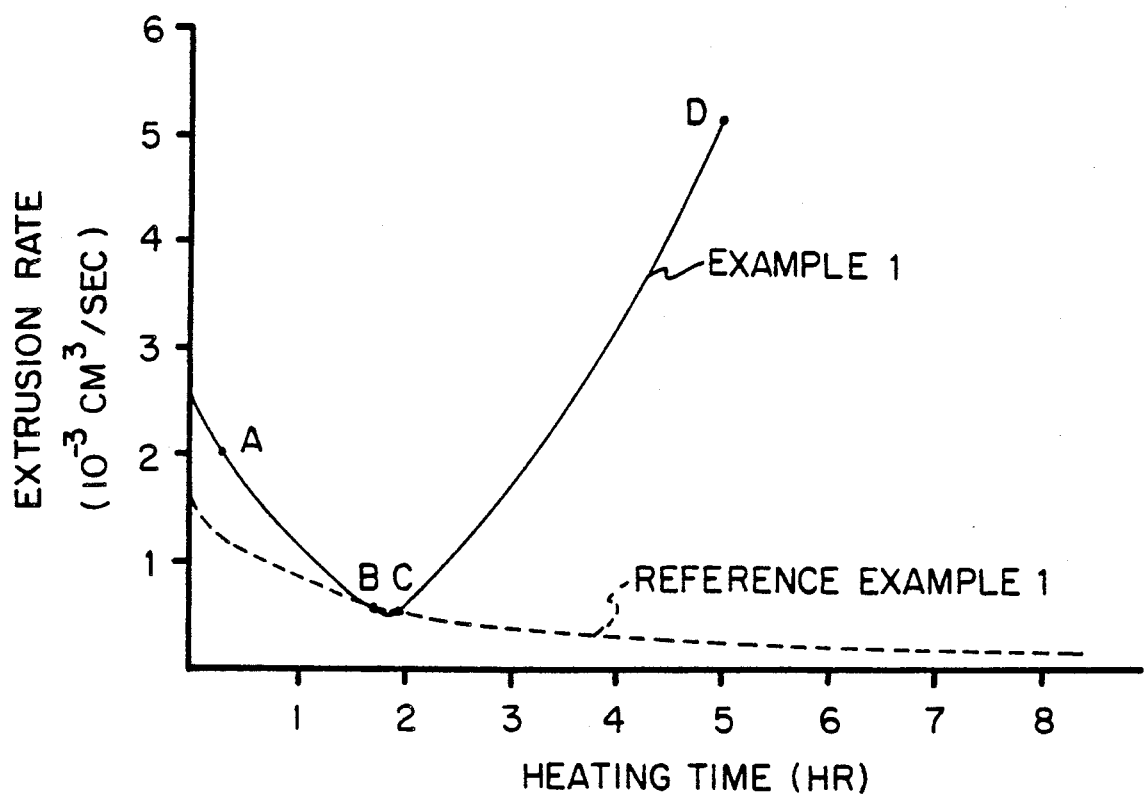
FIG. 1 shows the relationship between the heating time and the extrusion rate measured with a capillary rheometer (Koka Flow Tester). In the FIGURE, Points indicate as follows.

A: after 15 minutes,
C: after 2 hours,
B: after 1.75 hours or indicates a time where the extrusion rate is minimum between A and C.
D: after 5 hours.

What is claimed is:

1. An ethylene-vinyl alcohol copolymer composition consisting essentially of a salt of a metal belonging to group II of the periodic table in an amount converted to the metal of from 0.0005 to 0.05% by weight, an acidic substance having a pKa (acid dissociation constant at 25° C.) of at least 3.5 and a boiling point under atmospheric pressure of at least 180° C. in an amount of from 0.002 to 0.2% by weight, and a second acidic substance having a pKa of at least 3.5 and a boiling point under atmospheric pressure of not higher than 120° C. in an amount of from 0.01 to 0.2% by weight; said composition exhibiting such flow characteristics that:

in the relationship between the heating time and the extrusion rate at at least one temperature in a range of from 10 to 80° C. higher than the melting point of said ethylene-vinyl alcohol copolymer measured with a capillary rheometer (Koka Flow Tester), the extrusion rate does not substantially increase for the initial 15 minutes, thereafter the extrusion rate at any heating time after 15 minutes until 2 hours is in a range of from 1/10 to 50 times that after the initial 15 minutes, and the extrusion rate at any time after 2 hours until 10 hours is at least once in a range of from 2 to 50 times that after the initial 15 minutes.

2. An ethylene-vinyl alcohol copolymer composition as defined in claim 1, wherein said composition exhibits a flow characteristic of having an extrusion rate after 15 minutes of from 1/5 to 1 times that at the start.

3. An ethylene-vinyl alcohol copolymer composition as defined in claim 1, wherein said composition exhibits such flow characteristics that the extrusion rate after 2 hours through 10 hours increases with time in this time period.

4. An ethylene-vinyl alcohol copolymer composition as defined in claim 1, wherein the salt of a metal belonging to group II of the periodic table is at least one salt selected from the group consisting of carbonates, acetates, sulfates, phosphates of at least one metal selected from the group consisting of beryllium, magnesium, calcium, zinc and barium.

5. An ethylene-vinyl alcohol copolymer composition as defined in claim 1, wherein a salt of a metal belong to group II of the periodic table is at least one salt selected from calcium acetate and magnesium acetate.

6. An ethylene-vinyl alcohol copolymer composition as defined in claim 1, wherein the acidic substance having a pKa of at least 3.5 and a boiling point under atmospheric pressure of at least 180° C. is at least one member selected from the group consisting of succinic acid, adipic acid, benzoic acid, capric acid, citric acid, lauric acid, boric acid, potassium dihydrogen phosphate, and sodium dihydrogen phosphate.

7. An ethylene-vinyl alcohol copolymer composition as defined in claim 1, wherein the acidic substance having a pKa of at least 3.5 and a boiling point under atmospheric pressure of at least 180° C. is at least one member selected from the group consisting of potassium dihydrogen phosphate and sodium dihydrogen phosphate.

8. An ethylene-vinyl alcohol copolymer composition as defined in claim 1, wherein an acidic substance having a pKa of at least 3.5 and a boiling point under atmospheric pressure of not higher than 120° C. is acetic acid.

* * * * *

UNITED STATES PATENT AND TRADEMARK OFFICE
CERTIFICATE OF CORRECTION

PATENT NO. : 5,118,743
DATED : June 2, 1992
INVENTOR(S) : Kiyoshi Yonezu et al.

It is certified that error appears in the above-identified patent and that said Letters Patent is hereby corrected as shown below:

On the title page: Item [54]

please correct the title of the invention by deleting the word "METHYLENE"

and inserting -- ETHYLENE -- in lieu thereof.

Signed and Sealed this

Thirteenth Day of July, 1993

Attest:

MICHAEL K. KIRK

Attesting Officer     Acting Commissioner of Patents and Trademarks